FIG. 1.

INVENTOR.
WILLIAM W. ANDERSON

FIG. 6a. ROW-TO-ROW INTERPOLATOR OUTPUT

FIG. 6b. STRAIGHT LINE PROFILER OUTPUT

FIG. 6c. COMBINED DISCRIMINATOR OUTPUTS

Jan. 30, 1968   W. W. ANDERSON   3,366,935
AUTOMATIC CONTOUR DISPLAY

Filed Nov. 29, 1963   7 Sheets-Sheet 5

INVENTOR.
WILLIAM W. ANDERSON
BY *J C Hodges*
ATTY.
*Albert Loyr*
AGENT

Jan. 30, 1968  W. W. ANDERSON  3,366,935
AUTOMATIC CONTOUR DISPLAY
Filed Nov. 29, 1963  7 Sheets-Sheet 7

INVENTOR.
WILLIAM W. ANDERSON
BY *J. E. Hodges*
ATTY.
*Albert Hopp*
AGENT.

United States Patent Office 3,366,935
Patented Jan. 30, 1968

3,366,935
AUTOMATIC CONTOUR DISPLAY
William W. Anderson, 102 Magnolia Lane, Hilsmere Shores, Annapolis, Md. 21403
Filed Nov. 29, 1963, Ser. No. 327,155
11 Claims. (Cl. 340—173)

The invention described herein may be manufactured and used by or for the Government of the United States of America for governmental purposes without the payment of any royalties thereon or therefor.

The present invention relates to a system of information conversion and display and more particularly, to a system for receiving information from matrix planes of equally spaced data points and for automatically converting this information into complete contour-like surface plots.

The present system is particularly amenable for receiving as inputs signals from magnetometer arrays arranged to provide data representing magnetic field characteristics of bodies. One example of such an array is shown and described in an article by the present inventor appearing in the August 1960 issue of "Electrical Engineering," pp. 655-660. On pages 659 and 660 of said article, there is shown and described a flux gate magnetometer probe matrix arranged in evenly spaced parallel rows. Each flux gate magnetometer produces an output D.C. voltage indicative of magnetic field conditions at the magnetometer position. The output voltages of the magnetometer matrix are multiplexed by rows to provide a row-by-row series of digital voltage samples. It is this series of voltage samples which provides the data input to the present novel automatic converting and contour display system.

It is to be understood that the expression "contour plotting" as used herein refers to the plotting of data points of equal corresponding electrical value in each reference matrix plane.

The purpose of the present novel system is to provide an automatic contour plot of a data sensing array consisting of several planes of data sampling elements M arranged in a plurality of rows R in each plane. M and R are integers and may vary from plane to plane.

According to the present invention information from a matrix of sensing elements arranged in rows $N-1$, N, $N+1$, etc. is sampled and stored at a relatively slow rate row-by-row in order to obtain complete and accurate information from relatively slow-response magnetometer sensing elements. The stored information is then read out at a much faster rate so that time is made available for interpolating information values between the oldest two stored rows, say $N-1$, N during storage of a new row, $N+1$. The interpolated information provides greater data resolution for display purposes. The interpolated data is then converted into a suitable form for display.

It is among the objects of the present invention to provide a novel high resolution contour plotting and display system for sensing elements arranged in a matrix; to provide an improved contour plotting system with a minimum of moving parts; to provide a contour plotting system having improved data handling sub-system components therein, and to provide an improved arrangement for data handling for a contour plotting system.

The foregoing objects, as well as other objects, features and advantages of the present invention will be better understood by reference to the accompanying drawings in which like numerals represent like parts, and in which.

General description

Figure 1:
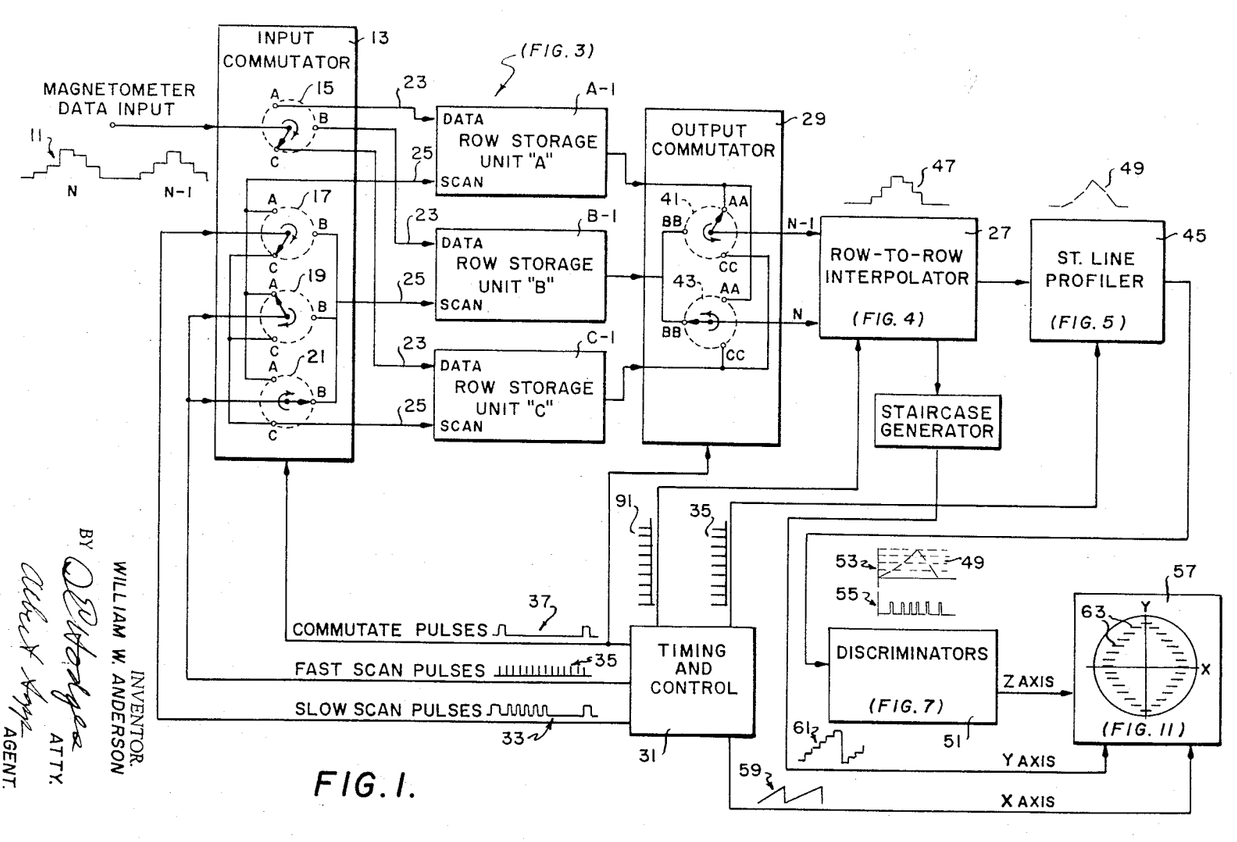
FIG. 1 is a schematic block diagram of the novel data conversion and display system according to one form of the present invention.

Referring to the system block diagram of FIG. 1, data input sample groups are shown for adjacent rows $N-1$ and N of matrix sensing elements. Each of the sample groups is composed of a plurality of D.C. voltage levels 11. Each voltage level 11 corresponds to a reading on a sensing element such as, for example, a flux gate magnetometer. The sensing elements are preferably arranged in a matrix consisting of a plurality of parallel spaced rows each having a plurality of sensing elements. For convenience in this description, three adjacent rows $N-1$, N and $N+1$ will be considered in relation to the treatment of input data to produce the desired display.

A write-in commutator 13 is shown symbolically as having an input data rotary switch 15 and three further rotary switches 17, 19 and 21 respectively. The four rotary switches 15-21 rotate in unison in the directions indicated by the arrows shown adjacent thereto. It is understood that any other suitable electronic or electromechanical commutation means may be employed to as equivalents to the rotary switches in write-in commutator.

The overall purpose of the write-in commutator 13 is to receive and to feed to a storage component at one rate input sample data from a new row $N+1$ of sensing elements and to transfer at a faster rate stored data from the two immediately previous rows N and $N-1$ from storage components of the system.

To this end each of the rotary switches 15, 17, 19, 21 has three contacts legended A, B and C respectively. There is a row storage unit $A-1$ for all of the "A" contacts; a row storage unit $B-1$ for all of the "B" contacts, and a row storage unit $C-1$ for all of the "C" contacts. The row storage units $A-1$, $B-1$, $C-1$ are identical, each having a data input terminal 23 and a scan terminal 25. The row storage units will be described in greater detail in conjunction with FIG. 3.

As illustrated in FIG. 1, the contact A of the data input switch 15 is shown connected to the data input terminal 23 of the row storage unit $A-1$; the contact B of the data input switch 15 is shown connected to the data input terminal 23 of the row storage unit $B-1$, and the contact C of the data input switch 15 is shown connected to terminal 23 of row storage unit $C-1$.

Thus, when the rotary arm of the data input switch 15 is located on contact A, data from, say, row $N-1$ is fed into the row storage unit $A-1$. Similarly, with said rotary arm on contact B, input data from, say, the next adjacent row N is fed into row storage unit $B-1$.

The data increments between rows $N-1$ and N will be interpolated while the input data switch is feeding the next adjacent row $N+1$ data via the contact C to the row storage unit $C-1$. To accomplish the interpolation, the stored data of rows $N-1$ and N is read out of the storage units $A-1$ and $B-1$ at a rate sufficiently rapid so that when a further adjacent row $N+2$ is ready to be stored, the $A-1$ storage unit will no longer require scanning and will be ready for receipt of $N+2$ row data samples.

The transfer of stored data for the $N-1$ and N rows for interpolation in a row-to-row interpolation unit 27 is carried out by means of an output commutator 29 operating in conjunction with fast scan readout pulses fed thru the input commutator 13 and with timing means for synchronizing the data transfer.

Figure 2A:
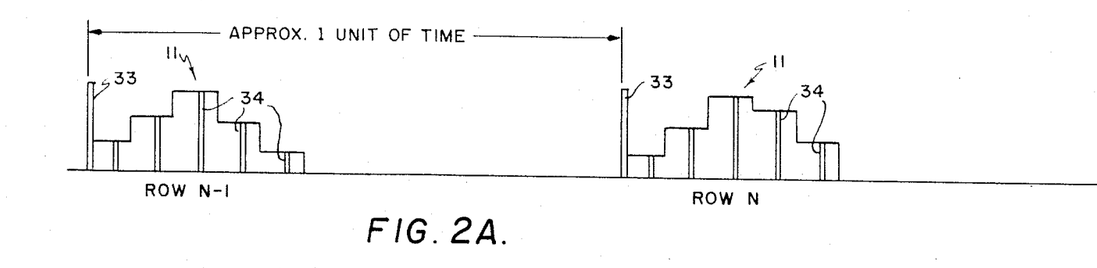
FIGS. 2a, 2b, 2c, 6a, 6b, 6c, 8 and 10 are graphical illustrations of waveforms occurring at various portions of the system according to the invention.

More specifically, a timing and control unit 31 generates slow scan write-in sync pulses 33, sampling pulses 34, and fast scan readout pulses 35. In the pulse train diagrams of FIGS. 2a, 2b, and 2c (which, for simplicity, relate to a 5 x 5 matrix) the repetition rate of the fast scan readout pulses 35 is shown for purposes of illustration to be approximately 1000 times that of the slow write in synchronizing pulses 33 and about 100 times that of the sampling pulses 34. The sampling pulses 34 occur at a rate approximately $\frac{1}{10}$ the interval between the pulses 35 and are suitably delayed so that for sampling purposes they occur in the smooth trailing portion of each of the input data pulses 11.

The timing and control unit 31 also generates by any suitable means commutation pulses 37 which are of approximately the same repetition rate as the slow scan write-in synchronizing pulses 33 and relative to which are slightly advanced in time position. One row of input data is written into one of the row storage units at the rate of the sampling pulses 34 during the interval between successive commutation pulses 37. Therefore, storage of input data occurs essentially during the interval between successive slow scan write-in pulses 33.

In FIG. 1, the positions of the rotary arms of the input switches 17, 19 and 21 as shown are such that while the data input switch 15 is writing in voltage samples of a new row $N+1$ into the storage unit $C-1$, the fast readout pulses 35 are being supplied to the contact A of switch 19 and to the contact B of the switch 21 respectively. Slow scan write-in pulses 33 and sampling pulses 34 are being supplied to the contact C of the input switch 17 to synchronize the writing in of the row $N+1$ row data pulses.

Since all of the A contacts of input switches 17, 19 and 21 are connected to the scan terminal 25 of the row storage unit $A-1$ and all the B contacts are connected to the scan terminal 25 of the storage unit $B-1$, fast scan readout pulses are thus being supplied to the row storage units A and B to read out rows $N-1$ and N. Row $N+1$ is being stored.

The output commutator 29 is arranged to connect those two of the row storage units $A-1$, $B-1$ and $C-1$ having the adjacent rows $N-1$ and N to the row-to-row interpolator 27. To this end, the output commutator 29 has a pair of rotary switches 41 and 43 respectively, each of said switches being rotatable in unison in the same direction as indicated by the arrows.

Each of the two switches 41, 43 has three contacts, AA, BB and CC. Each of the contacts AA is connected to the output end of the row storage unit $A-1$; the contacts BB, to the row storage unit $B-1$, and the contacts CC to the row storage unit $C-1$. The rotary arms of the switches 41 and 43 are each connected to the row-to-row interpolator 27.

Since, as shown in FIG. 1, the row $N+1$ is being written into the $C-1$ storage unit, the $N-1$ and N rows now stored in units $A-1$ and $B-1$ respectively are read out by virtue of the rotary arms of switches 41 and 43 being connected, under control of the commutation pulses 37, to the contacts AA and BB respectively.

During the interval of connection of the rotary arms of switches 41 and 43 to said AA and BB contacts, fast scan readout pulses are applied to the row storage units $A-1$ and $B-1$ so that the stored row data therein is readout at the pulse repetition rate of the fast scan pulses 35. Since fast scan pulses 35 occur at a much faster rate than slow input pulses 33, the stored row information is supplied to the interpolator 27 many times repetitively between slow scan sync pulses depending upon the number of interpolations desired between successive rows.

After feeding of the rapidly read-out $N-1$ and N rows of voltage data samples into the interpolator 27, each of the switches 15, 17, 19, 21, 41 and 43 is advanced to the next contact in the directions indicated by the arrows so that the rows N and $N+1$ become the stored rows in units $B-1$ and $C-1$ to be read out and interpolated while a new row, $N+2$ is written into the storage unit $A-1$, and so on.

The output of the row-to-row interpolator 27 is fed to a straight line profiler 45 (described in detail in FIG. 5) which produces straight line segments or profiles of the interpolated row data. As an example, each row of voltage sample pulses 47 produced by the interpolator 27 is converted to leading or trailing edge-connected straight line profile samples 49 by means of the profiler 45.

The profiled samples 49 are then fed from the profiler 45 to an amplitude discriminator gamut 51 (described in greater detail in connection with FIGS. 7 and 9). The discriminator gamut 51 collectively determines the points of intersection of the profile or contour lines 49 with a datum or axis voltage level of the particular interpolated row. As an example, the profiled voltage levels 49 are effectively passed thru the discriminator levels 53 of the discriminator 51. The discriminator 51 produces output pulses 55 which are positioned in time so that they correspond to the profile intersections with a voltage level corresponding to a particular contour level of interest. As the system changes from one interpolated row to the next, the pulses 55 change their time positions along the fast scan time base in exactly the same manner as the profile or contour line inter-sections along the interpolated row axis vary from one interpolation to the next.

Output display apparatus 57 of any suitable design is connected to the output of the discriminator gamut 51 which supplies pulses 55 thereto as Z axis (on-off) input pulses. For example, where a high resolution CRT is employed as a display means, the pulses 55 are applied to a suitable beam control electrode to selectively switch on the electron beam of the CRT.

The output display apparatus 57 also receives an X-axis linear sweep or saw-tooth signal 59 proportional to the time base of the fast scan pulses 35. Inasmuch as apparatus for producing linear saw-tooth waves is well-known in the art, it will not be described in detail.

A Y-axis staircase signal 61 is also fed to the display apparatus 27 proportional to the position of the fast scan pulses 35 indicating interpolation position with respect to positional row displacement along the matrix. Any suitable staircase generator connected for response to the fast scan pulses 35 may be employed. For a given contour voltage level, the resulting output on a display device 57 such as a CRT is a series of short dashes 63 moving in and out along a horizontal line that travels down the vertical axis Y of the CRT. For a magnetometer matrix this series of dashes 63 is thus the contour of points of equal flux lying in a plane in the vicinity of the magnetic specimen being tested.

*Detailed description*

Figure 3:
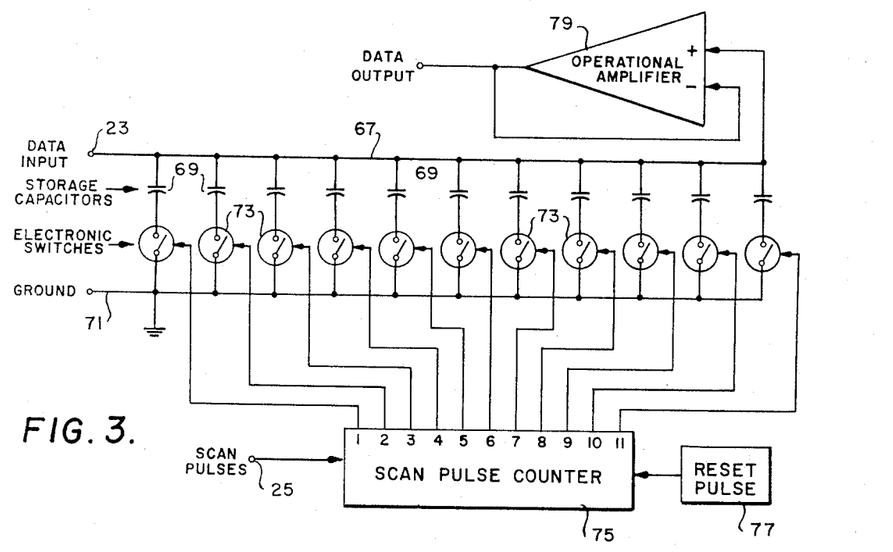
FIG. 3 is a schematic block diagram illustrating a row storage unit according to the present invention.

The row storage units $A-1$, $B-1$, $C-1$ are identical, and one of these units is shown in detail in FIG. 3. The data input terminal 23 and the fast scan readout terminal 25 are shown to the left in FIG. 3. Incoming row data at input terminal 23 appears on an input bus 67. A bank of capacitors 69 is connected to the input bus 67 for storing the incoming row information. Each capacitor in the bank 69 is connected to a grounded bus 71 via a normally open electronic switch 73 of any suitable design.

The switches 73 are controlled by a scan pulse counter 75 of any suitable design. The pulse counter 75 receives as its input scan pulses at the terminal 25. The number of stages of the pulse counter, here shown for purposes of illustration only to be eleven, depends upon the number of rows of sensing elements in the matrix.

The pulse counter 75 activates each of its outputs sequentially with each scan pulse received. Thus, with the first pulse, output 1 is active, thereby closing its respective one of the switches 73. The second scan pulse causes the active output to change from position 1 to position 2, thereby opening the first and closing the second of the switches 73. The counter continues stepping until the desired number of capacitors has been scanned. For example, for a sensing matrix having eleven rows of eleven sensing elements in each row, the counter 75, during read in, will step eleven times to charge the capacitors 69 to their respective voltages and then supply a reset pulse to reset the counter, thus leaving open all of the switches 73. During read out, the switches 73, are actuated in a similar fashion, causing the voltage on each capacitor to be registered in sequence, at a faster rate, at the data output. Any suitable logic means 77 may be employed to reset the counter 75. Of course, the eleven stage storage unit shown for purposes of illustration in FIG. 3 may be adapted by appropriate additive connections, or by appropriate disconnections, to operate for any number of stages corresponding to matrix sizes.

A high impedance operational amplifier 79 of any suitable well-known construction is connected at its input end to the bus 67. As each of the capacitors 69 is grounded, the operational amplifier 79 registers its stored voltage as data output without appreciably disturbing the voltage stored on the capacitor.

The row storage unit of FIG. 3 operates in the following manner: The trailing edge of the first of the slow write-in sync pulses 33 causes the pulse counter 75 to count one, thereby grounding the first of the storage capacitors 73. During the time interval between the trailing edge of the first write-in sync pulse 33 and the trailing edge of the first of the data sampling pulses 34, the first of the capacitors 73 charges up to the value of the first sampled data input voltage of the pulses 11. The slow write-in sync pulses 33 continue to advance the counter 75 in the foregoing manner until all the data input voltages 11 are stored and the counter 75 has entered the reset condition.

Figure 2B:
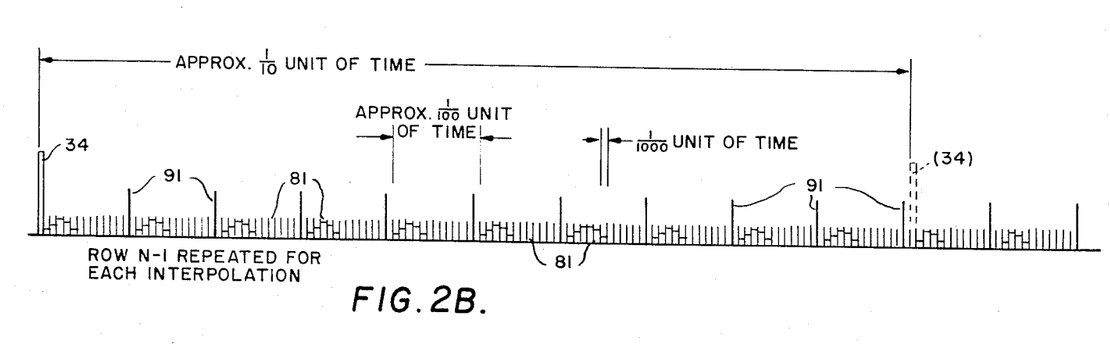
Figure 2C:
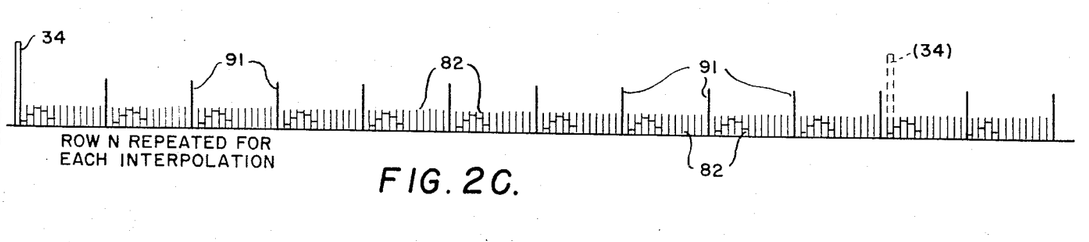

For fast scan readout, the data input bus 67 is disconnected from the matrix by means of the input commutator 13. The fast scan readout pulses 35 ground the capacitors in rapid succession, the capacitors registering voltages at the data output in accordance with the respective voltage levels stored therein. As the stored input voltage levels are read out, the operational amplifier 77 produces at its output successive, identical time-compressed replicas 81 (FIG. 2b) of the stored input pulse train 11 for the row $N-1$. Replicas 82 representing row N shown in FIG. 2c are produced in a similar manner. As many replicas 81 and 82 as interpolation steps are provided. For example, if the row-to-row interpolator 27 is to carry out 32 interpolation steps, then the row storage units for the $N-1$ and N rows produces 32 replicas 81 and 82 of the two stored rows $N-1$ and N between which the interpolation steps are to be made.

Figure 4:
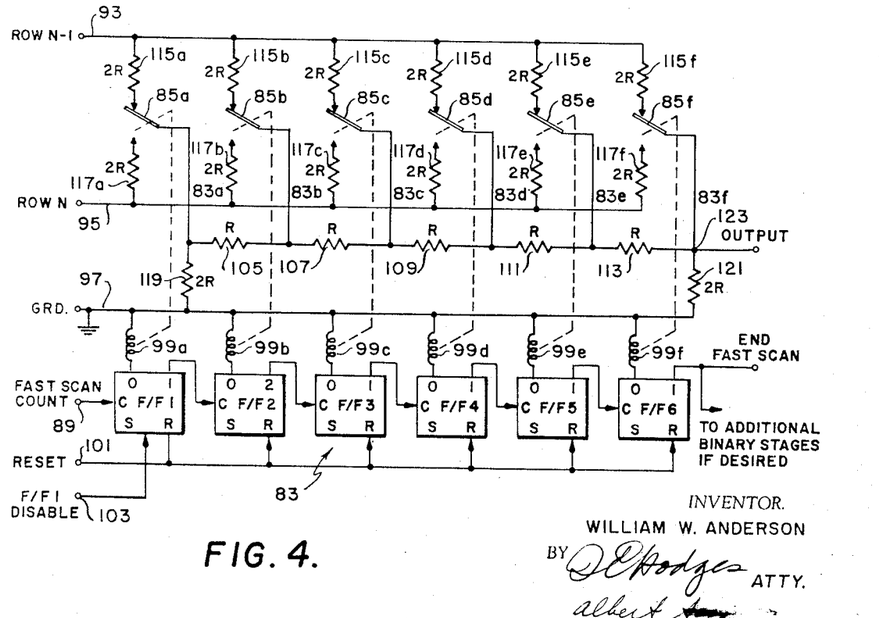
FIG. 4 is a schematic diagram of a row-to-row interpolator according to this invention.

The row-to-row interpolator 27 is shown in the simplified schematic diagram of FIG. 4. The interpolator 27 receives the $N-1$ and N fast readout data from the readout commutator 29 and incrementally combines these data to form a series of linear interpolations beginning with the row $N-1$ and ending with the row N. The interpolation function is described by changing in small and equal increments from 0 to 1 an interpolation factor K. K may be defined as the ratio of the distance from row $N-1$ divided by the total distance between row $N-1$ and N.

As shown in FIG. 4, the row-to-row interpolator 27 is composed of a multi-stage binary counter 83 having six stages 83a, 83b, 83c, 83d, 83e, and 83f. In each of the stages 83a–83f there is a relay armature contact arm 85a–85f respectively.

Each relay arm 85a–85f switches in and out of connection with various portions of a respective passive resistance network provided for each stage.

As an illustration, and not by way of limitation, the binary counter 83 is shown having six stages composed of serially connected flip-flops legended F/F-1–F/F-6 respectively. Thus, the binary counter 83 is capable of a binary count to $2^6$ or 64.

An input terminal 89 connected to the input side of F/F-1 receives timing or counting pulses 91 which, by virtue of any suitable pulse generating or frequency converting means in the timing and control unit 31, are made to occur at the end of each of the replicas 81, 82. An illustrative representation of the relationship of the timing or counting pulses 91 to other pulses in the system is shown in FIGS. 2b and 2c.

During the first fast scan readout, but before the first of the pulses 91 appears, all of the flip-flops F/F-1–F/F-6 remain in the reset position which is taken to be the binary number "zero." When the first of the pulses 91 is fed into the terminal 89, the flip-flop F/F-1 is activated, giving a binary count of "one." At the end of the second fast readout scan, the appearance of the second of the pulses 91 causes the flip-flop F/F-1 to return to its "zero" state, and the flip-flop F/F-2 is activated by the "one" output of F/F-1, resulting in a binary count of "two."

The flip-flop F/F-1–F/F-6 are thus stepped 64 times thereby permitting 64 interpolations. Obviously, for a larger number of interpolations, additional flip-flops may be employed. That is, for 128 interpolations, seven flip-flops would be needed. For 32 interpolations, only five flip-flops would be required.

As shown in FIG. 4, there is provided an input bus 93 for the row $N-1$ and an input bus 95 for the row N. The interpolations to be carried out are step-by-step incremental values of the row sample voltages starting with the row $N-1$ and moving toward the more recent row N. A common return or ground bus 97 is shown connected at suitable points to each of the legended "zero" outputs of the flip-flops F/Fs–F/F-6 via relay coils 99a–99f for the respective stages. As indicated by the dashed lines, the relay coils 99a–99f control the respective contact arms 85a–85f. With the flip-flops at "zero" output, the contact arms are biased to their up positions. A reset terminal 101 and a disable terminal 103 are provided for respectively resetting all of flip-flops and for turning off F/F-1 in a conventional manner.

The buses 93, 95 and 97 are interconnected by means of the identical resistance networks. The resistance network in the first stage consists of a resistance 105a of a constant value R connecting the relay armature 85a of stage 83a with the relay arm of the stage 83b. In a similar manner, a resistance 107 of value R connects the relay arms 85b and 85c; a resistance 109 of value R connects the relay arms 85c and 85d; a resistance 111 of value R connects the relay arms 85d and 85e, and a resistance 13 of value R connects the relay arms 85e and 85f.

A plurality of resistances, 115a–115f, each of a value 2R, is connected to the input bus 93 for the $N-1$ row, and a plurality of resistances 117a–117f each of a value 2R is connected to the input bus 95 for the N row. For the first stage 83a, the resistances 115a and 117a are located in opposing relation so that the relay contact arm 85a is movable by its respective coil 99a for electrical contact with either the resistance 115a or the resistance 117a. Resistances 115b and 117b are similarly located with respect to relay contact arm 85b, and so on throughout the six stages of the interpolator illustrated in FIG. 4.

A resistance 119 of value 2R connects the contact arm 85a and the resistance 105 to the ground lead 97. Another resistance 121 of the value 2R connects the junction 123 of the output side of resistance 113 and the contact arm 85f to the ground lead 97. The output of the interpolator 27 is taken from the junction 123.

The effect of the resistance network is that the resistances 115a–115f and 117a–117f provide at the output 123 a linear combination of the voltage levels 11 in the rows N–1 and N depending upon the positions of the contact arms 85a–85f. However, this linear combination is modified by the overall voltage dividing action of the passive resistance network composed of the resistances 105, 107, 109, 111, 113, 119 and 121 so that the interpolation is carried out with a constant attenuation factor of 2/3. This attenuation is compensated by a 1.5 amplification factor in the straight line profiler stage 45.

In the operation of the ladder type network of FIG. 4, when the first stage contact arm 85a engages the resistance 117a, the contribution of the N row is 1/64 of the voltage at output 123. With only the arm 85b in its down position, the row N contribution is 1/32; with only the contact arm 85c down, the row N contribution is 1/16; with only the contact arm 85d down, the row N contribution is 1/8; with only the contact arm 85e down, the row N contribution is 1/4, and with the last contact arm 85f down, the row N contribution is 1/2 the total voltage at output 123. The flip-flops F/F–6 control the positions of the contact arms 85a–85f so that for each binary "one" output of the flip-flops, a contact arm in one of the stages 83a–83f engages a respective one of the resistances 117a–117f. Consequently, with a binary output of 000010 (decimal 16 reading right to left) along the contact arm 85e is down, and the row N contribution is 1/4. With contact arms 83a and 83e down (producing a binary 100010 or decimal 17 reading right to left), the row N contribution is 1/4 plus 1/64 or 17/64 of the total output. Thus, the row N contribution is equal to the ratio of the decimal equivalent of the binary output of the flip-flops to the number 2 raised to a power equal to the number of flip-flops.

During the first fast scan, all of the relay contact arms 85a–85f are in the up positions as shown in FIG. 4. The up positions of the relay contact arms correspond to the binary number zero. Assuming 64 interpolations are to be made (i.e. with the six stage counter shown in FIG. 4), the incremental contribution K has a zero value. Thus, only the row N–1 is contributing to the output. During the second fast scan, the flip-flop F/F–1 produces a "one" output thus deenergizing coil 99a so that the contact arm 85a drops to its lower position (indicated in dashed lines) for contact with resistance 117a. The resistances of the resistance network are so proportioned (as indicated by the R+2R values) that with the contact arm 99a in its down position, the output at junction 123 is composed of 63/64 of the N–1 row voltage values and 1/64 of the N row voltage values.

For a binary count of two, the contact arm 85a is up and the arm 85b is down. This condition results in a 62/64 contribution by the N–1 row and a 2/64 or 1/32 contribution by the N row. For a binary "three" count, both flip-flops F/F–1 and F/F–2 are in the "one" condition, and arms 85a and 85b are both in their lower positions while the remaining contact arms are in their up positions. For a binary "four," only the arm 85c is in its lower position, and the N–1 row contribution is 60/64 while that of the row is 4/64 or 1/16.

The flip-flops F/F–1–F/F–6 are stepped by the pulses 91 until the 64 interpolation steps are completed—that is, when F/F–6 has gone through a "zero" output into a "one" output; and returned to a "zero" output. The reappearance of the "zero" output of F/F–6 resets the flip-flops and disables F/F–1 until the next row N+1 of incoming data has been fully read in to storage unit C at its slow rate. After said next row has been read in to storage unit C, the next set of fast scans is commenced.

Of course, the number of interpolations may be varied depending upon the size or density of the sensing matrix. As an example and not by way of limitation, applicable in principle to both X axis and Y axis scanning; in the table below is illustrated the fast readout scanning relationship among the indicated factors:

| Matrix Size | No. of Readings per Row | Scan Time (msecs.) | Row-to-Row Interpolation Time (msecs.) | Total Fast Scan Time (msecs.) | Total No. of Scans | Total Time for all Fast Scans |
|---|---|---|---|---|---|---|
| 11 x 11 | 11 | 11 | 10 | 21 | 32 | 672 |
| 7 x 7 | 7 | 7 | 10 | 17 | 64 | 1,088 |
| 5 x 5 | 5 | 5 | 10 | 15 | 64 | 960 |

Figure 5:
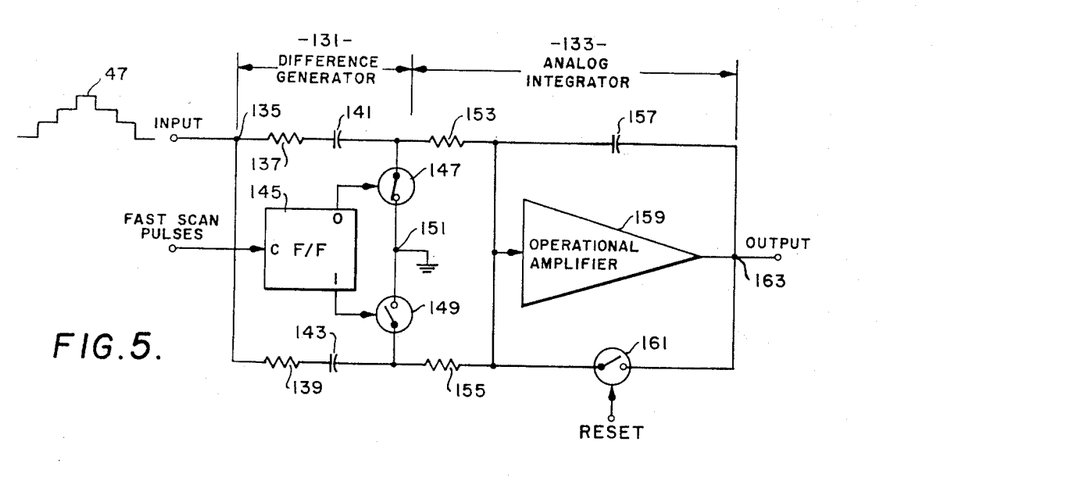
FIG. 5 is a schematic block diagram of a straight line segment profiler according to this invention.

Reference is now made to FIG. 5 which illustrates in block diagram form the straight line profiler 45. The purpose of the profiler 45 is to transform the interpolated step voltage levels 47 produced by the interpolator into a series of straight line segments or ramps. These segments or ramps are formed by connecting the leading edges of adjacent data readings as shown in the waveform diagrams of FIGS. 6a and 6b.

The straight line profiler of FIG. 5 is a circuit composed of a difference generator portion 131 and an analog integrator portion 133. The interpolated data readings 47 are fed via an input terminal 135 and via parallel load-limiting resistors 137 and 139 to two parallel related capacitors 141 and 143. A flip-flop 145 controlled by the fast scan readout pulses 35 has its "zero" and "one" outputs respectively connected to electronic switches 147 and 149 of any suitable design. The output sides of the switches 147 and 149 are connected to ground at a junction 151. Thus the capacitors 141 and 143 can be alternatingly grounded by the two switches 147 and 149 under control of the opposite sides of the flip-flop 145. With each individual reading of the data readings 47, the two capacitors are therefore alternately grounded and ungrounded.

The integrator portion 133 of the straight line profiler has an RC time constant circuit composed of resistors 153, 155 in the respective circuit paths and a capacitor 157. An operational amplifier 159 of any suitable construction is connected to receive signals from either output path of the differential generator. A reset switch 161 is connected in parallel with the operational amplifier 159 with respect to an output junction 163. The reset switch 161 is closed by a reset pulse during the "off" or "dead" time between each fast scan so that accumulated drift of the integrator over successive fast scans is prevented. The count pulses 91 may be suitably delayed for use as reset pulses controlling the switch 161.

Figure 6A:
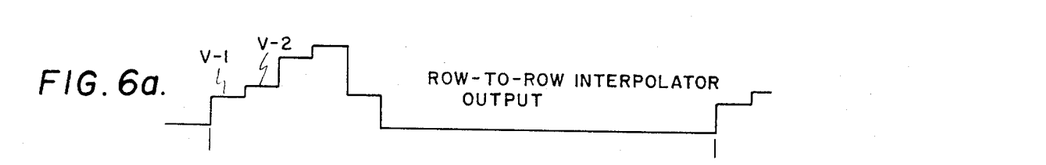
Figure 6B:
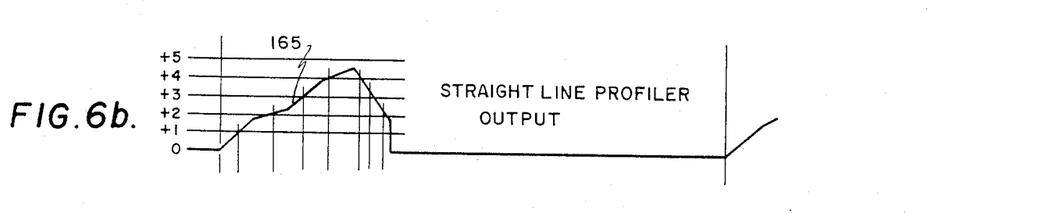
Figure 6C:
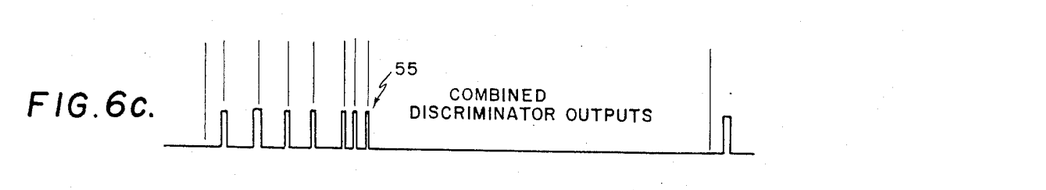

The straight line profiler operates as follows:

Assuming an input reading of $V_i$ as shown in FIG. 6a, and the switch 147 closed and the switch 149 open, the capacitor 141 is grounded and will charge up to a value V-1. During the next reading, V-2, the positions of the switches 147 and 149 are reversed. The bottom path or leg of the integrator 133 thus receives no signal from the capacitor 143 because the capacitor 143 is now grounded.

However, the signal present at the top path or leg of the integrator row consists of the present reading $V_2$ minus the previous reading $V_1$ across the condenser 141. This difference produces the waveform 165 shown in FIG. 6b wherein the respective voltage lines occur from the origin of the leading edge of one reading to the origin of the leading edge of the next reading. Of course, the first straight line segment of the waveform 163 has no meaningful significance because it only represents the raising of the integrator to the value of the first data reading.

Figure 7:
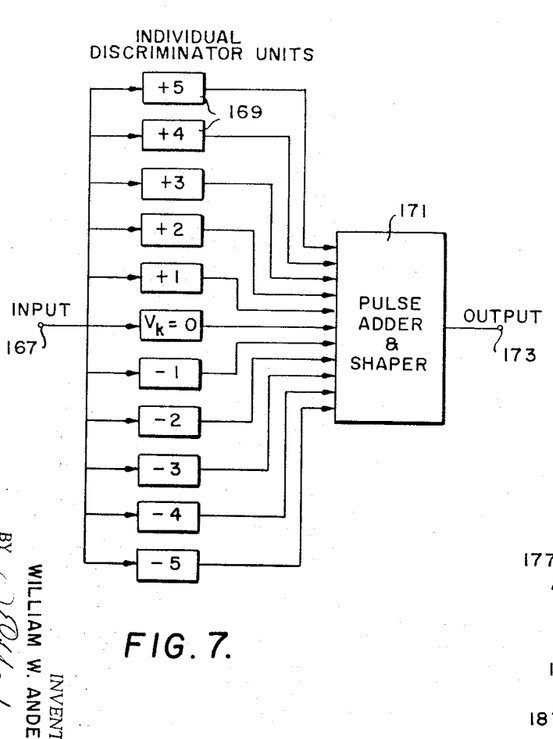
FIG. 7 is a schematic block diagram of an arrangement of discriminator units according to the invention.

Reference is now made to FIG. 7 which illustrates in block diagram form an embodiment of a discriminator arrangement according to the invention. A specific discriminator circuit will be described in detail in conjunction with FIG. 9.

Figure 8:
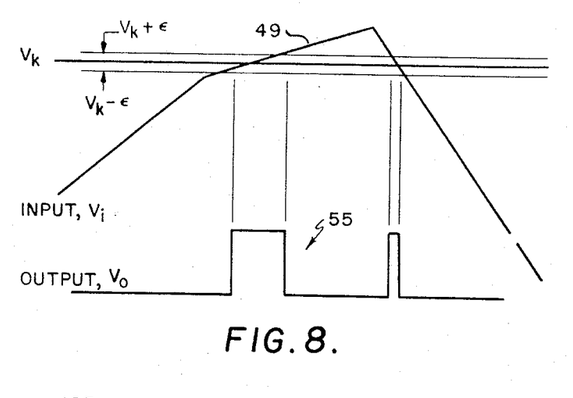

As previously stated in conjunction with FIG. 1, the discriminator gamut or bank 51 serves to translate the waveform 49 into a series of pulses 55 of constant amplitude and of varying width in accordance with the slope of a segment of the waveform 49 as it passes thru a reference voltage level. An expanded view of the waveforms 49 and 55 is shown in FIG. 8.

In FIG. 7, an input terminal 167 receives the straight line segmented waveform output 49 from the profiler 45. This output is fed to eleven parallel-connected paths in each of which is a discriminator unit 169. The individual discriminator units are identifiable in that the numerical representative voltage or "contour" discrimination level $V_k$ is legended in the respective units. Essentially, the discriminator detects the points of intersection of the basically analog waveform 49 with the levels $V_k$ of interest. Mathematically, this may be expressed as follows:

$$V_o = K \text{ for } V_k - \epsilon \leq V_1 \leq V_k + \epsilon$$
$$V_o = 0 \text{ for } V_1 = \text{all other values}$$

where:
  $V_1$ = input voltage
  $V_o$ = output voltage
  $V_k$ = contour level voltage
  $\epsilon$ = fixed small voltage The above mathematical expression is graphically shown in FIG. 8. The waveform 49 has an input voltage $V_i$ which, in one discriminator, passes thru a level $V_k$ which actually has a finite width with an upper level $V_k + 6$ and a lower level $V_k - \epsilon$. Thus the use of a small voltage $\epsilon$ defines an essentially minimum width of the discriminator output pulses 55 so that for all slopes of the segments of the waveform 49, an output pulse having sufficient width for display purposes will be produced. The actual width of the pulse also indicates changing conditions relative to a sensor element in comparison with adjacent sensing elements.

The outputs of the respective discriminators 169 are fed to a pulse adder and shaper 171 which serializes the parallel discriminator outputs into output pulses 55 at an output terminal 173. The pulses 55 serve as a Z-axis control input for a display apparatus such as the CRT 57. Appropriate blanking signals may be employed according to well-known practice for producing clear images on the CRT face.

Figure 9:
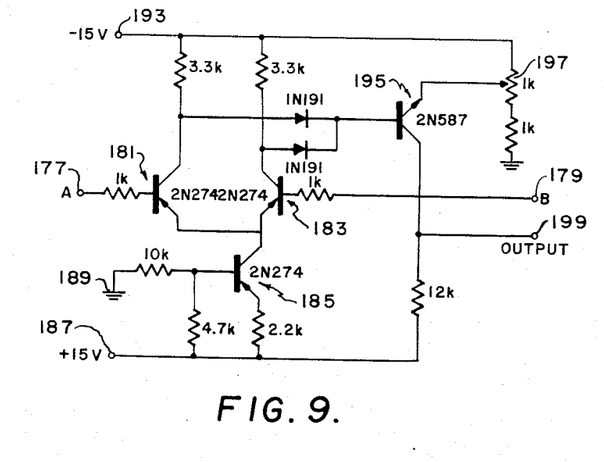
FIG. 9 is a schematic diagram of one of the discriminator units of FIG. 7.

Although any suitable discriminator circuit may be employed in each of the discriminator units 169, the transistorized discriminator circuit shown in FIG. 9 in schematic form may be advantageously employed as a discriminator unit.

In the circuit of FIG. 9, an input terminal 177 receives the essentially analog voltage segments from the straight line profiler 45. A terminal 179 is held at a constant reference voltage. A first PNP transistor amplifier 181 is connected at its base via a suitable dropping resistor to the terminal 127 and a second PNP transistor amplifier 183 is connected via a suitable dropping resistor at its base to the reference terminal 179. A PNP transistor 185 is biased in its base-emitter circuit via suitable resistances from reference potential sources 187 and 189 so that the transistor 185 produces essentially constant current at its collector. The collector of the transistor 185 is connected at a junction 191 to each emitter of the respective transistors 181 and 183. The collector electrodes of the transistors 181 and 183 are suitably biased by means of a negative reference potential source 193 via suitable resistors. The collector outputs of the transistors 193 and 185 are respectively diode-coupled to the base of an output PNP transistor 195. The transistor 195 takes its emitter bias via a resistance 197 the value of which may be varied as indicated. The discriminator output 199 is taken from the collector of the transistor 195.

The respective circuit components shown in FIG. 9 may have the values or be of the component types indicated thereon in legend.

The operation of the circuit of FIG. 9 will now be explained in conjunction with the waveform diagrams illustrated in FIGS. 10a, 10b, 10c and 10d.

Figure 10A:
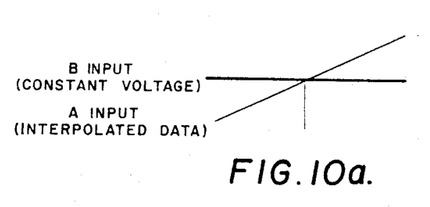

With the input voltage at the terminal 177 less than the reference voltage at the terminal 179, the transistor 181 is cut off and the transistor 183 is saturated or on. With the input voltage at the terminal 177 greater than the reference voltage at the terminal 179, the transistor 181 is saturated and the transistor 183 is cut off. As shown in FIG. 10a the terminal 179 is held at the constant reference voltage $V_k$ while the input straight line ramp voltage $V_i$ is fed into the circuit at terminal 177.

Figure 10B:
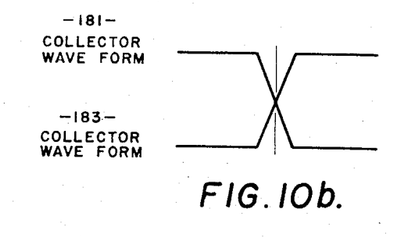
Figure 10C:
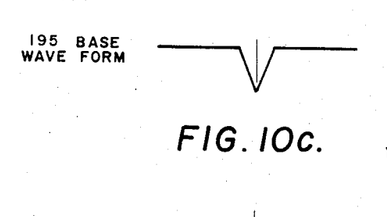

At the cross over point of the voltges $V_k$ and $V_i$, the transistors 181 and 183 switch from the on to off state or vice versa as indicated by the collector waveforms of the respective transistors 181 and 183 shown in FIG. 10b.

Figure 10D:
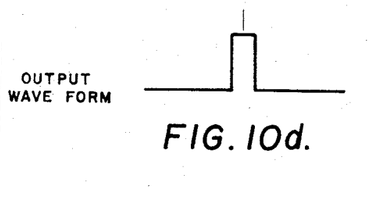

The rate of switching between the transistors 181 and 183 is controlled both by the rate of increase of the voltage at input terminal 177 and by the gain in the transistors 181 and 183. The diode coupling of the transistors 181 and 183 results in the waveforms shown in FIG. 10c at the base of the transistor 195. The collector output pulse waveform 55 of the transistor 195 is shown in FIG. 10d. Varying the emitter voltage of the transistor 195 controls the width of the pulse 55 shown in FIG. 10d. The control of the width of the pulse 55 thus establishes the values of the small voltage $\epsilon$. Where the discriminator circuit of FIG. 9 has input range of from $-5$ to $\pm 5$ volts, $\epsilon$ may be about 100 millivolts. Frequency response of the circuit is from D.C. to a maximum input rate of change of 5 volts per millisecond at which operating point some frequency limiting of the output pulses 55 begins to occur. For no discrimination, the output voltage equals about $-11.5$ volts. During discrimination, the output voltage reaches about $+8.5$ volts.

Figure 11:
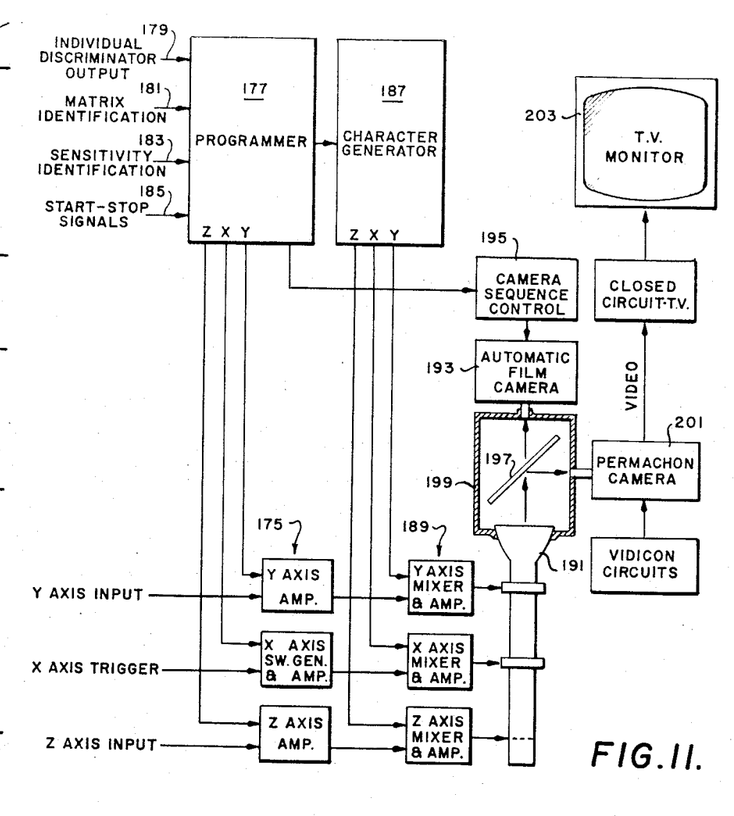
FIG. 11 is a schematic block diagram of a display arrangement according to the invention.

Reference is now made to FIG. 11 which illustrates in block diagram form a display arrangement which may be employed in carrying out the present invention.

The generation of X, Y and Z axis display control signals has already been described. Leads carrying these signals are legended to the left in FIG. 11 and are shown connected to the input sides of respective legended amplifiers 175 therefor.

A programmer 177 is provided for controlling the display information. The primary function of the programmer 177 is to provide control signals in digital form for identifying a particular sensing matrix and contour level being read out. The programmer 177 receives as one input signals from each of the discriminator units 169 via a plurality of leads 179.

A matrix identification signal is fed to the programmer via a lead 181. The matrix identification signal may be generated by the input commutator 15 or by any other suitable means. Sensitivity identification is supplied via a plurality of leads 183 directly from the sensing elements of the matrix. A three digit counter (not shown in detail) is provided in the programmer 177 and is fed by stop-start signals from any suitable source via leads 185 to provide signal information in digit form indicating the number of the particular contour run being made.

The production of information signals such as characters by which the contour being read out may be visually identified is carried out by a character generator 187. The character generator may be composed of a plurality of individual character generators (not shown) each of which produces a particular identifying character such as a numeral "1, 2," etc. Inasmuch as character generators are well known in the art, their detailed construction will not be described in detail. However, in one type of character generator which may be employed in carrying out the invention, a Lissajous pattern is generated from X, Y axis signals on a CRT. Z axis signals from the discriminators 51 translated into digital form in the programmer 177 control the electron beam of the CRT so that certain portions of the strokes of the Lissajous pattern are blanked out to form the character. Of course, any other suitable character generating means may be employed. X, Y and Z signals from the character generator 187 and from the amplifiers 175 are combined in respective X, Y and Z axis mixer-amplifiers 189. The outputs of the respective X and Y mixer-amplifiers 189 are then fed to any suitable deflection control means coupled with a display CRT 191. The Z axis signals are fed to a control electrode for selectively interrupting the CRT electron beam.

A camera 193 is provided for permanently recording the contour images appearing on the face of the CRT. The camera 193 may have an automatic film advance mechanism controlled by a camera sequence control device 195 of any suitable construction. The sequence control device 195 may in turn be actuated by stop-start signals from the programmer 177 in any suitable manner.

A half-silvered mirror 197 may be located in a light-tight box 199 for reflecting the image on the CRT 191. The reflected image may then be processed by a conventional television camera 201 for closed circuit transmission to television monitors indicated by the numeral 203.

Figure 12A:
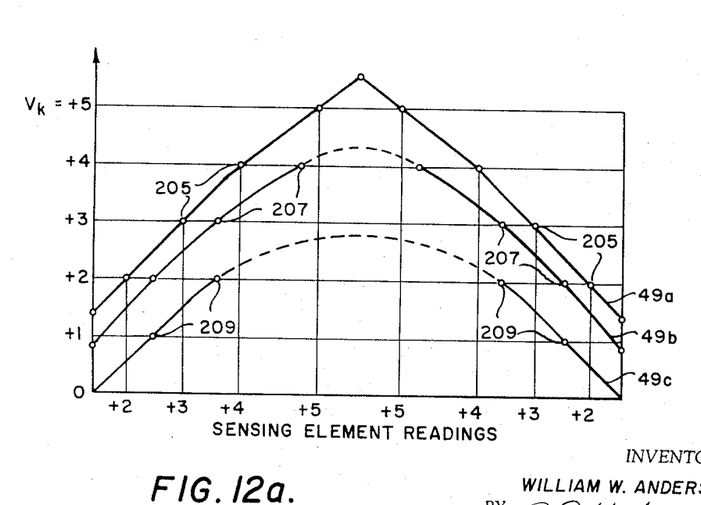
FIGS. 12a and 12b are graphs based on waveforms for explaining the contour construction techniques according to the invention.
Figure 12B:
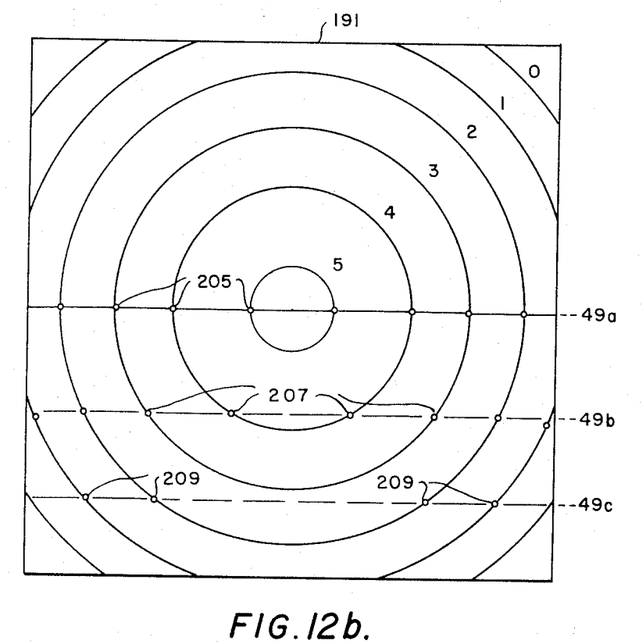

Reference is now made to FIGS. 12a and 12b as an aid in explaining the operation of the present invention. FIGS. 12a and 12b taken together illustrate the contour producing technique of the present invention.

In FIG. 12a is shown a plot of three exemplary interpolated and profiled sensing element data readings versus the discriminator levels $V_k$. As row after row of matrix data is fed into the system, the profiled, interpolated waveform may be thought of as continually varying while moving across a three dimensional region divided by several arbitrary parallel planes corresponding to the respective voltage levels $V_k$. The waveforms 49a, 49b and 49c represent three positions of this waveform.

In the example of where magnetic lines of force around a magnetic specimen or model are being measured, it would be expected that the greater magnetic forces would be present near the specimen. With this example in mind, as the continually varying waveform "moves" across the matrix from one end toward the other, the portions of the waveform intersecting $V_k=1$ occur at first. This is shown in FIG. 12b which illustratively represents the contour lines which would appear for a five by five matrix on the face of a display tube 191.

The profiled waveform when at position 49a has its highest values. The points 205 at which the profiled waveform at 49a intersects the respective discriminator levels $V_k$ establish Z axis outputs at the points 205 on the face of the CRT 191.

When the waveform has reached the position indicated at 49b, the intersection of its straight line segments with the discriminator levels produces outputs at points 207 on the face of the CRT 191. And when the waveform has reached position 49c, the resulting intersection of the waveform with the discriminator levels results in the outputs at points 209 on the face of CRT 191.

It is thus seen that as the waveform 49 moves in correspondence to interpolated sensing element readings across the matrix, the outputs as represented illustratively by points 205, 207 and 209 move in and out on the CRT face to produce contour lines such as those shown in FIG. 12b.

Thus, as the voltage on the Y axis deflection plates of the CRT incrementally changes with each interpolation, a new row of data points is plotted on the face of the CRT. Consequently the production of output data points with each interpolation results in an accurate high resolution display.

Obviously many modifications and variations of the present invention are possible in the light of the above teachings. It is therefore to be understood that within the scope of the appended claims the invention may be practiced otherwise than as specifically described.

What is claimed is:

1. A system for producing from a series of discrete data signals . . . $N-1, N, N+1,$ . . . being fed into the system at one rate, output signals including interpolated signals corresponding to the input signals $N-1$ and N at a much faster rate, said output signals being employed for a contour display plot wherein each curve of the plot represents a group of data points of equal value, the system comprising:

a plurality of storage means;
pulse generating means for producing: slow scan sync pulses for controlling slow write-in of data to said storage means; sampling pulses for accurate sampling of input signal levels; fast scan readout pulses for reading out from said storage means data stored therein at a much faster rate than the write-in rate; and commutation pulses occurring at approximately the same rate as said slow scan sync pulses;
input commutation means connected to each of said storage means and controlled by said commutation pulses for switching one of said storage means to a write-in condition for storing an $N+1$ data signal therein under control of said slow scan sync pulses and said sampling pulses;
said other two storage means having previously stored therein $N-1$ and N data series by means of said input commutation means;
said input commutation means simultaneously switching both of said other storage means into a condition for readout under control of said fast scan readout pulses while said $N+1$ data signals are being written in;
interpolation means for producing step by step at the rate of said fast scan readout pulses a plurality of interpolated discrete data signals having values at a plurality of levels between the levels of corresponding portions of successive input data signals $N-1$ and N;
said interpolated discrete data signal levels having successive levels starting with approximately $N-1$ values and progressing step-by-step toward N values;
output commutation means connected to each of said storage means and having two outputs connected in parallel to said interpolation means for coupling under control of said commutation pulses the two storage means having the previously stored data signals $N-1$ and N to said interpolation means while the $N+1$ data signals are being written in;
straight line wave shaping means connected to said interpolation means for producing a group of variable sloped analog signals corresponding to each interpolated data signal, wherein each slope corresponds to the difference in level between each successive portion of the interpolated data signal;
a parallel gamut of discriminators connected to said straight line wave shaping means for producing a plurality of pulses corresponding to points of intersection of sloped portions of each of said variably sloped waveforms with a level of a plurality of spaced constant voltage levels, whereby successive groups of pulses are produced, one group for each interpolated data signal including each data input signal, the positions of the pulses in each group corresponding to each discriminator level being representative of positions of data points describing a contour of closely spaced points having an equal value;

means connected to said interpolated means for producing a Y-axis staircase signal having one level for each interpolated data signal including the $N-1$ and N data signals;

means for generating an X-axis linear sweep signal for each interpolated data signal including the $N-1$ and N data signals; and display means connected to the discriminators the pulse group output of which provides on-off Z axis signals for said display means, said display means also being connected to receive as inputs thereto said X- and Y-axis signals.

2. The system according to claim 1 but further characterized by said display means comprising a cathode ray tube wherein said Z-axis pulses control the on-off action of the electron beam thereof.

3. The system according to claim 1 but further characterized by said straight line wave shaping means comprising:

a difference generator having first and second parallel input paths for receiving the output of said interpolation means;

a storage device for each of said paths;

a ground terminal;

switch means connected to each of said parallel input paths for alternately connecting to said ground terminal said storage devices at the rate of said fast scan readout pulses said input paths;

whereby the voltage output of the differential generator is composed of a succession of differences in successive voltages stored in said storage devices; and integrator means coupled to receive the output of the differential generator for producing a voltage output in the form of a straight line segment connecting similar points on successive levels of each of the data signals.

4. The system according to claim 1 but further characterized by each data input signal comprising a plurality of D.C. voltages.

5. Apparatus for generating from successive discrete groups of data signals a surface described by a plurality of spaced contour lines of respectively equi-potential values comprising:

means for generating for each discrete group of data signals a variably sloped waveform each slope of which represents the difference between successive signal levels occurring in each pulse group;

means for detecting the points of intersection of each slope with one of a plurality of spaced, constant value reference potentials;

whereby those points representing slope intersections with each respective constant value reference potential describe a plurality of points for one of a group of respectively corresponding contour lines.

6. Apparatus according to claim 5 but further characterized by:

means responsive to said means for detecting, for providing an output pulse for display purposes for each said intersection occurring within each discrete pulse group.

7. A system for producing from a series of discrete data signals ... $N-1$, N, $N+1$, ... being fed sequentially into the system at one rate, output signals representing at least a plurality of replicas of the $N-1$ and N data signals occurring repititiously at a rate much faster than said one rate while the $N+1$ data signal is being written into the system, said system comprising:

three data storage means each having a write-in terminal and an input control terminal;

pulse generating means for producing commutation pulses;

said pulse generating means further producing sampling pulses for obtaining an accurate sample of each desired signal level portion of each said discrete data signal, and for producing fast scan readout pulses occuring at a rate much faster than said commutation pulses;

input commutation means for feeding input data signals to the write-in terminal of each of said storage means in sequence at the rate of said commutation pulses;

whereby the data signals $N-1$, N and $N+1$ become stored in that order in successive ones of said storage units;

first, second and third further commutation means each having a first, second and third output terminal and having means for selectively coupling each of said first output terminals to the input control terminal of one storage means; and for selectively coupling each of said second terminals to the input control terminal of said second storage means, and for selectively coupling each of said third terminals to the input control terminal of said third storage means;

means supplying sampling pulses to said first further commutation means and for supplying fast scan read pulses to said second and third further commutation means;

said first further commutation means having means for distributing sampling pulses to the write-in terminal of that storage means into which the $N+1$ data signal is being written;

each of said second and third further commutation means having means for distributing fast scan readout pulses to those two storage means in which $N-1$ and N data signals have been stored;

said fast scan readout pulse distribution being carried out simultaneously with said sampling pulse distribution; and output means connected to said storage means for receiving fast readout replicas of both said $N-1$ and N data signals at a rate much greater than their input rate.

8. The system according to claim 7 but further characterized by said output means comprising:

first and second commutation means connected to receive the output of each of said storage means and connected to said pulse generator for receiving commutation pulses;

output utilization means;

said output commutation means having means for coupling to said further utilization means only those storage means in which $N-1$ and N data signals are stored.

9. A system for translating a cyclical step function waveform to an essentially analog function corresponding to said step function wherein the analog function consists essentially of a plurality of straight line segments representing the overall profile of said step function, said system comprising:

a difference generating circuit having first and second parallel input paths for receiving the step function waveform;

a storage device located in each of said parallel input paths;

a source of pulses having a repetition rate at least approximately equal to the recurrence rate of the steps in the step function waveform;

a ground terminal;

switch means connected to said ground terminal and to said source of pulses and to each of said input paths for alternately connecting said storage devices to said ground terminal at the rate of said pulses, whereby the voltage output of the differential generator is composed of a succession of differences in successive voltages stored in said storage devices; and integrator means connected to receive the output of each input path of the differential generator, for producing a voltage output in the form of a straight line segment connecting like parts on successive levels of the step function.

10. The system according to claim 9 but further characterized by said integrator means comprising:

an operational amplifier connected to receive the output of both said input paths;

storage means connected in parallel with said operational amplifier; and reset means connected in parallel with said operational amplifier.

11. A system for generating from successive discrete groups of data signals a surface described by a plurality of spaced contour lines of respectively equipotential values comprising:

means for generating for each discrete group of data signals a variably sloped waveform each slope of which represents the difference between successive signal levels occurring in each pulse group;

discriminating means for detecting the point of intersection of each slope with one of a plurality of spaced, constant value reference potentials;

whereby those points representing slope intersections with each constant value reference potential may describe a plurality of points for one of a group of respectively corresponding contour lines.

No references cited.

TERRELL W. FEARS, *Primary Examiner.*